Sept. 28, 1926.
C. S. REEDER
1,601,604
SIGNAL
Filed July 17, 1926
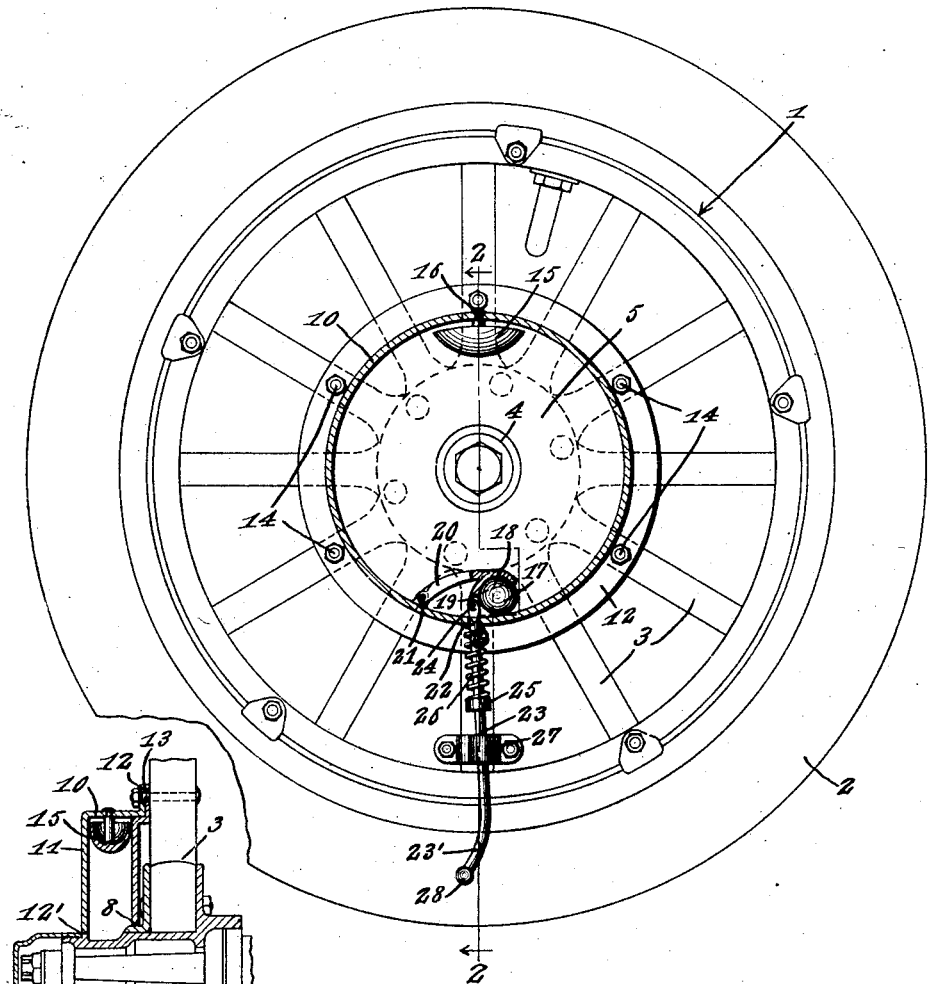
C. S. Reeder, INVENTOR.
BY
Geo. F. Kimmel, ATTORNEY.

Patented Sept. 28, 1926.

1,601,604

UNITED STATES PATENT OFFICE.

CHARLES S. REEDER, OF PETROLIA, KANSAS.

SIGNAL.

Application filed July 17, 1926. Serial No. 123,105.

This invention relates to a tire deflation signal for use in connection with pneumatic tires, and has for its object, to provide in a manner as hereinafter set forth, a device of such class for producing an audible signal to notify the driver of a motor vehicle that the tire, with which the device is associated, has become deflated.

Further objects of the invention are to provide, in a manner as hereinafter set forth, a tire deflation signal, which is simple in its construction and arrangement, strong, durable, compact, automatic in its action, thoroughly efficient in its use, readily installed with respect to the tire of a wheel, and comparatively inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation of a motor vehicle wheel provided with a pneumatic tire and showing the adaptation therewith of a deflation signal in accordance with this invention and with the signal being illustrated in vertical section.

Figure 2 is a section on line 2—2 Figure 1.

Figure 3 is an inverted plan of the projectile holder.

Referring to the drawings in detail 1 denotes a motor vehicle wheel provided with a pneumatic tire 2. The spokes of the wheel 1 are indicated at 3.

The tire deflation signal, in accordance with this invention, is adapted to be secured to several spokes 3, upon the outer side thereof and further to surround the hub 4 and also to oppose the tire 2. The signal includes an apertured disk 5 which is inset as at 6 and with the inset portion terminating in a laterally projecting annular flange 7 seating against the spokes 3. The aperture in the disk 5 is indicated at 8 and which provides for the passage of the hub 4. The inset portion 6 provides a clearance for the outer hub flange and to permit of the seating of the flange 7 against the spokes 3. The disk 5 further provides the inner wall of an annular casing 9 which consists of a body portion 10 and a front 11 which is formed with an aperture 12' for the passage of the hub 4. The body portion 10 seats against the inturned portion 6 of the disk 5 and is formed with a laterally extending flange 12 which abuts the flange 7. The flanges 7 and 12 are formed with registering openings 13 for the passage of hold fast devices 14 to fixedly secure the casing 9 against the spokes 3.

Arranged within the casing 9, that is to say suspended therein, is one or more gongs or bell members and as shown but one gong is illustrated and indicated at 15. A hanger member 16 is fixedly secured to the body portion 10 of the casing 9, extends inwardly with respect to said body portion 10 and is formed integral with the inner face of a gong 15 whereby the latter is suspended within the casing 9. Associated with the gong 15 for the purpose of giving an audible signal to indicate to the driver of the vehicle that the tire has become deflated is a whirlable projectile 17 which is normally retained in a stationary position. When the projectile 17 is released it is whirled around the casing 9, due to the action of the wheel 1 as the vehicle travels, and the projectile will contact with the gong 15 and provide for the audible signal. The projectile 17 is normally retained in a stationary position by a holder member 18 which is semi-spherical in contour and is adapted to overlap the projectile 17, see Figure 1, for the purpose of clamping it against the inner face of the body portion 10 of the casing 9 to prevent any whirling action being given to the projectile 17 when the tire 2 is not deflated. The projectile 17 is of globular form. The holder member 18 is provided with a pair of apertured ears 19 at the edge thereof and formed integral with the holder member 18 is a curved arm 20 which is pivotally connected as at 21 to the inner face of the body portion 10 of the casing 9.

Extending through an opening 22 formed in the body portion 10 of the casing 9, is a spring controlled retainer device for the holder member 18 and the said device consists of a bar 23 having an angularly disposed outer terminal portion 23'. The inner end of the bar 23 is pivotally connected as at 24 to the ears 19. Carried by the bar 23 is a collar 25 and mounted on the bar 23 and interposed between the collar 25 and the body portion 10 of the casing 9, is a coiled controlling spring 26, which normally acts to maintain the holder 18 in position to prevent the shifting of the projectile 17, and the normal position of the holder member 18 is as illustrated in Figure 1. Connected to a spoke 3, is a combined keeper and guide 27 for the bar 23. The outer end of the bar 23 is of globular contour, as indicated at 28.

The bar 23 extends from the rim of the wheel towards the axis of the latter, but at an angle sufficient to throw the inner end of the bar forward off-center, so that when the tire becomes deflated the lever is forced upwardly and shifts the holder 18 and releases the projectile 17. When the projectile 17 is released it is whirled around the casing 9 and contacts with the gong 15 thereby providing an audible signal so that the driver of the vehicle will know that the tire has become deflated. The bar 23 is shifted by contact with the ground during the travel of the wheel.

It is thought that the many advantages of a tire deflation signal, in accordance with this invention can be readily understood, and although the preferred embodiment of the invention is as illustrated and described, yet it is to be understood that changes in the details of construction can be had which will fall within the scope of the invention as claimed.

What I claim is:

1. A tire deflation signal for connection to a pneumatic tired wheel comprising a normally stationary whirlable projectile, a gong impacted by the projectile when the latter is released, a pivoted element for normally holding said projectile stationary, a housing common to said projectile, gong and element, and a normally stationary shiftable retainer device connected to and maintaining said element in normal position and adapted to be shifted in one direction by impacting against a road surface to move said element to release said projectile.

2. A tire deflation signal for connection to a pneumatic tired wheel comprising a normally stationary whirlable projectile, a gong impacted by the projectile when the latter is released, a pivoted element for normally holding said projectile stationary, a housing common to said projectile, gong and element, a normally stationary shiftable retainer device connected to and maintaining said element in normal position and adapted to be shifted in one direction by impacting against a road surface to move said element to release said projectile, said device being spring controlled and including a bar having an angularly disposed outer terminal portion.

3. A tire deflation signal for connection to a pneumatic tired wheel comprising a normally stationary whirlable projectile, a gong impacted by the projectile when the latter is released, a pivoted element for normally holding said projectile stationary, a housing common to said projectile, gong and element, a normally stationary shiftable retainer device connected to and maintaining said element in normal position and adapted to be shifted in one direction by impacting against a road surface to move said element to release said projectile, said device being spring controlled and pivoted to said element, and said element pivoted to said housing.

4. A tire deflation signal for connection to a pneumatic tired wheel comprising a normally stationary whirlable projectile, a gong impacted by the projectile when the latter is released, a pivoted element for normally holding said projectile stationary, a housing common to said projectile, gong and element, a normally stationary shiftable retainer device connected to and maintaining said element in normal position and adapted to be shifted in one direction by impacting against a road surface to move said element to release said projectile, said device being spring controlled, pivoted to said element and having an angularly disposed outer terminal portion, and said element pivoted to said housing.

In testimony whereof, I affix my signature hereto.

CHARLES S. REEDER.